United States Patent Office 3,236,481
Patented Feb. 22, 1966

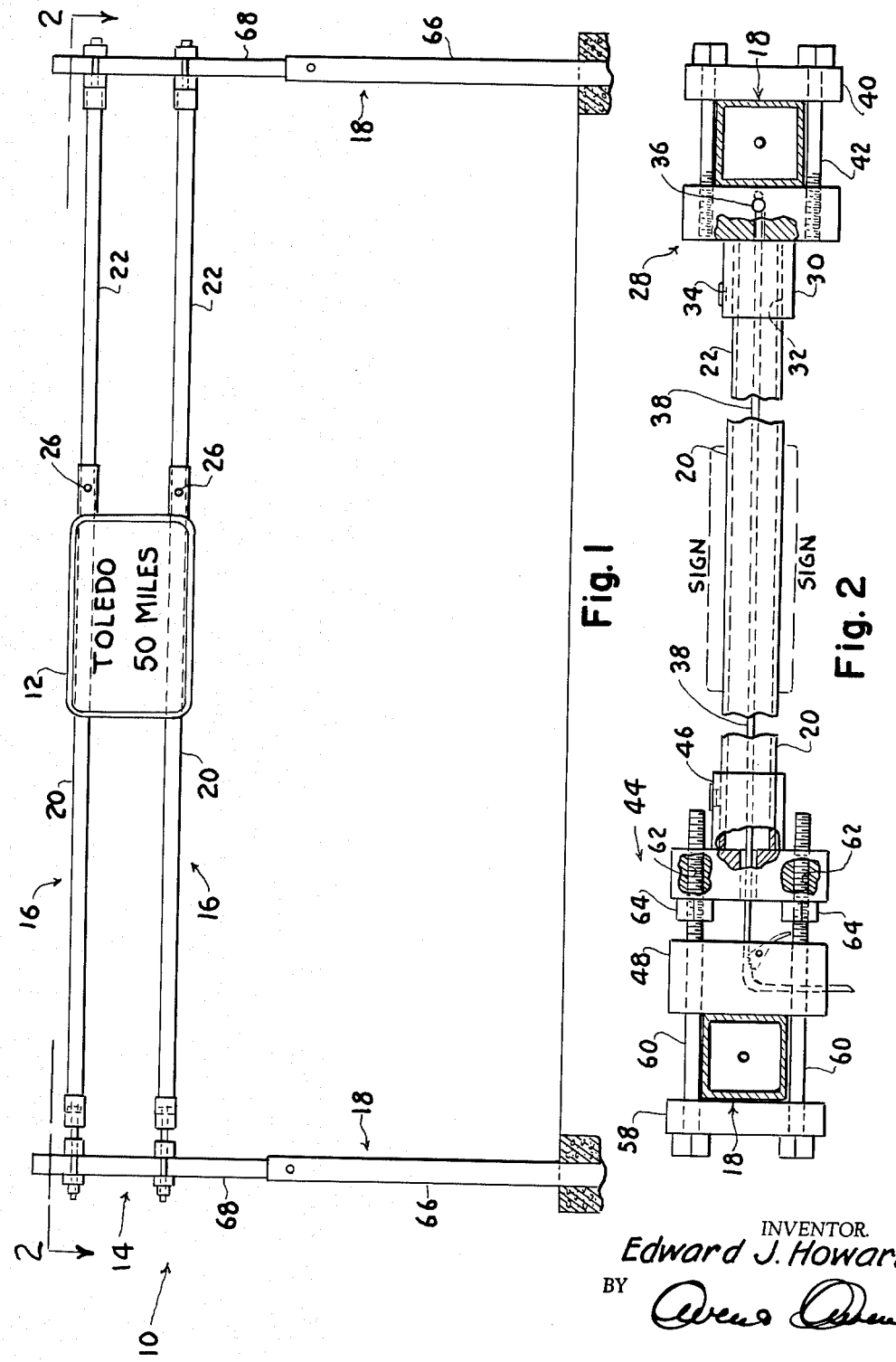

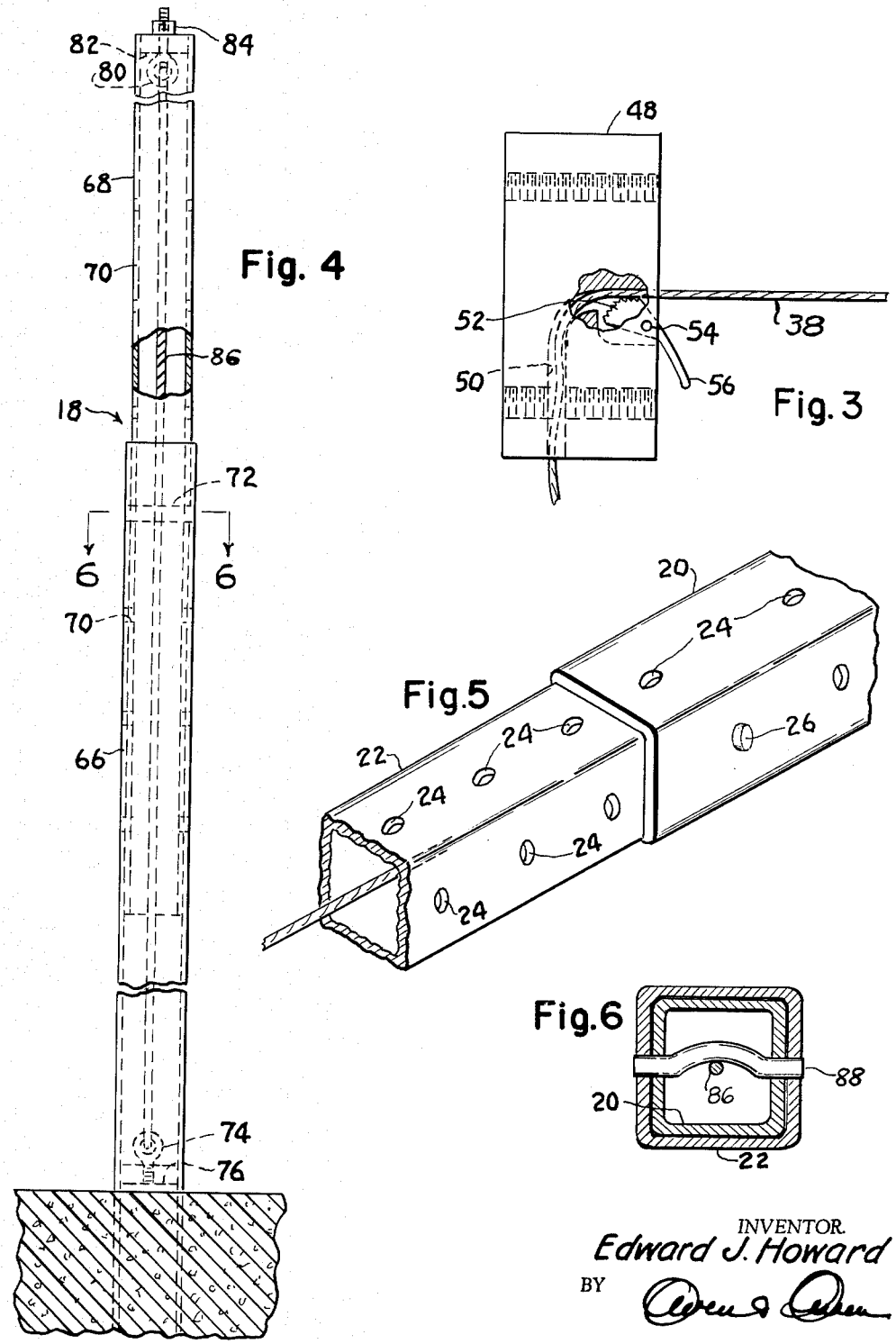

1

3,236,481
STRUCTURAL MEMBER PARTICULARLY FOR HIGHWAY SIGNS
Edward J. Howard, Toledo, Ohio, assignor to U. S. Standard Sign Co., Toledo, Ohio, a corporation of Ohio
Filed May 20, 1963, Ser. No. 281,601
5 Claims. (Cl. 248—33)

This invention relates to a stressed structural member and more particularly to such a structural member for use in highway sign supports.

A structural member according to the invention basically comprises an elongate, hollow body with which is associated a cable, means being provided to place the cable under tension and at the same time to place the hollow body under compression. Such a structural member is both stronger and stiffer than is an elongate, hollow body used alone. The structural member according to the invention is particularly useful in highway signs of the overhead type, the horizontal supports for which often must span a substantial distance, over several lanes of highway, to vertical supports on either side thereof. Such sign supports heretofore have often required relatively complex girder members to provide the necessary rigidity and strength to withstand the force of wind on the signs carried thereby. Such sign supports have therefore been time consuming and costly to erect.

An overhead highway sign support according to the invention includes only one or a few horizontal supporting members which are maintained in compression between a pair of vertical supports on each side of the highway, often being a substantial distance apart. The compression on the horizontal supports is made possible by a cable associated therewith and placed in tension. The vertical supports can also be maintained under compression by means of a cable under tension as will be discussed more fully subsequently.

It is, therefore, a principal object of the invention to provide an improved structural member having higher strength and more rigidity for a given size and weight.

Another object of the invention is to provide an improved structural member including an elongate, hollow body under compression and a cable associated therewith under tension.

Still another object of the invention is to provide an improved highway sign support which is less expensive and easier to install.

Other objects and advantages of the invention will be apparent from the following detailed description of a preferred embodiment thereof, reference being made to the accompanying drawing, in which:

FIG. 1 is a front view in elevation of a highway sign and a highway sign support embodying the invention;

FIG. 2 is a fragmentary plan view, with parts broken away and with parts in section, on an enlarged scale, taken along the line 2—2 of FIG. 1;

FIG. 3 is an enlarged view, with parts broken away and with parts in section, of a component of the assembly of FIG. 2;

FIG. 4 is a fragmentary view, with parts broken away and with parts in section, of an upright member of the sign support of FIG. 1;

FIG. 5 is a fragmentary view in perspective of a hollow, elongate body constituting a part of the structural member of the invention; and

2

FIG. 6 is a view in vertical cross section of two telescoping elongate bodies, a connecting pin, and the cable associated therewith, as used in the support of FIG. 1.

Referring to the drawings, and more particularly to FIG. 1, an overhead highway sign according to the invention is indicated at 10 and includes a sign panel 12 with suitable indicia thereon and a sign support generally indicated at 14. The sign support 14 includes horizontal structural members 16 and upright supporting members 18, one on each side of the highway. Fewer or more of the horizontal structural members 16 can be employed, depending upon various factors such as the length of the span, the size and number of the sign panels 12, and the maximum wind expected in the area. Also, a cantilever type of support can be used, with only one vertical member then used.

The horizontal structural member 16 includes two elongate, hollow members or tubular bodies 20 and 22 which are sized and shaped so that the smaller body 22 will fit into the larger one 20 in telescoping relationship. Each of the bodies 20 and 22 has a plurality of openings 24 extending longitudinally on opposite sides thereof, as shown in FIG. 5, for the receipt of a connecting pin 26.

The right end of the structural member 16 is shown in FIG. 2 and includes an end connection generally indicated at 28 which serves both to help place the bodies 20 and 22 in compression and to clamp the structural member 16 to the right hand upright member 18. The end connection 28 includes an end base 30 having a recess 32 in which the end of the tubular body 22 is received and held by a set screw 34 or other suitable means. The end base 30 also includes an anchor pin 36 or other suitable device for anchoring an end of a metal cable 38 which extends through the tubular bodies 20 and 22 and is maintained in tension to place the bodies 20 and 22 in compression, as will be discussed more fully subsequently. The end base 30 is clamped to the right hand upright member 18 by a rear clamping plate 40 which is connected to the end base 30 by a plurality of bolts 42 which are threadedly engaged in the base 30 to draw it and the clamping plate 40 together as the bolts are tightened.

At the opposite end of the horizontal structural member 16 is an end connecton indicated at 44 including an end base 46 which is similar to the first end base 30 except that the cable 38 extends completely through the end base 46 and is anchored in an intermediate clamping plate 48. For this purpose, the intermediate clamping plate 48 has an L-shaped passage 50 (FIG. 3) therein through which the cable 38 is strung and into which passage a dog 52 extends. The dog 52 is pivotally mounted in a slot in the clamping plate 48 by a pivot pin 54 and has a handle portion 56 extending outwardly in front of the clamping plate 48, if desired. A rear clamping plate 58 (FIG. 2) is located on the opposite side of the left hand upright member 18 and is connected to the intermediate clamping plate 48 by a plurality of bolts 60. The bolts 60 are threadedly engaged with the intermediate clamping plate 48 so that the two clamping plates are drawn toward one another when the bolts are tightened. However, the bolt 60 also extends completely through the clamping plate 48 and into or through the end base 46, loosely fitting in bores 62 in the end base 46. Nuts 64 are threaded on the bolts 60 between the intermediate clamping plate 48 and the end base 46, these nuts being capable of forcing the end base 46 and the clamping plate 48 away from one another. Many means can be used for moving the end base 46 and the intermediate clamping plate 48 apart and it is to be understood that these need not be limited to the nut and bolt arrangement specifically shown.

The assembly of the horizontal structural member 16 with respect to the upright members 18 will now be discussed. The cable 38 is strung through the telescoped bodies 20 and 22 with the right end of the cable anchored in the end base 30, which is fastened to the end of the smaller tubular body 22 by means of the set screw 34. The end base 46 is assembled with the opposite end of the larger tubular body 20 with the cable 38 extending therethrough. The two elongate bodies 20 and 22 are then moved inwardly or outwardly with respect to one another until the desired length of the composite is obtained, with the connecting pin 26 then inserted through aligned holes 24 in the two bodies. The rear clamping plate 40 is then connected to the end base 28 by the bolts 42 with are then tightened to clamp the end base 28 securely in place. Similarly, the rear clamping plate 58 is connected to the intermediate clamping plate 48 by means of the bolts 60 which are tightened to position the second end base 46 in its proper relationship with respect to the left hand upright member 18. The cable 38 is then tightened by being pulled through the L-shaped passage 50 in the intermediate clamping plate 48 to place the cable under initial tension. When the cable 38 is then released, the dog 52 squeezes it against the opposite side of the passage 50 to prevent it from loosening. With the cable thus under initial tension or at least taut, the nuts 64 are screwed outwardly on the threaded portion of the bolts 60 to urge the second end base 46 and the intermediate clamping plate 48 apart, thereby placing the cable 38 under further tension and placing the tubular bodies 20 and 22 in compression. This adds substantial strength and rigidity to the overall structure 16 and greatly simplifies the design of the sign support 14. The support 14 requires only one or a few of the structural members 16 compared with the relatively complicated and involved supporting structures heretofore required.

The sign support 14 can be constructed in a slightly different manner when the length of the horizontal member 16 is known fairly accurately. In such an instance, the cable 38 can be cut to predetermined length and anchored in the intermediate clamping plate 48 in a manner similarly employed for the end base 28. With the cable anchored permanently in place in the intermediate clamping plate 48 as well as in the end base 28, the hollow bodies 20 and 22 are moved outwardly from one another until the cable is in initial tension or at least taut. The connecting pin 26 is then inserted through the aligned holes 24 to keep the members 20 and 22 in fixed positions relative to one another. The assembled structural member 16 is then clamped to the uprights 18 by the rear clamping plates 40 and 58 in the manner previously discussed. The nuts 64 on the bolts 60 are then turned outwardly to place the cable 38 under further tension and the elongate bodies 20 and 22 under further compression, as discussed before.

The upright structural members 18 can also be constructed in a manner somewhat similar to that employed for the horizontal support 16. Accordingly the upright member 18 includes two telescoping members or bodies 66 and 68 which can be similar to the bodies 20 and 22 with openings 70 spaced longitudinally along at least a part of their lengths. The height of the upright member 18 is determined by inserting a connecting pin 72 through the appropriate openings 70. A suitable eye-bolt 74 is anchored at the lower end of the upright elongate body 66 by a plate 76 which, in turn, is suitably affixed in the lower end of the tubular member 66. A second eye-bolt 80 is supported at the upper end of the upright body 68, extending through a plate 82 and threadedly engaged with a nut 84. When the nut 84 is turned to draw the eye-bolt 80 upwardly, it places a cable 86 under tension, the cable 86 being suitably attached to the bolts 74 and 80. The tension on the cable 86 then places the longate bodies 66 and 68 in compression to supply strength and rigidity to the overall upright 18.

A curved pin 88 can be used to connect the elongate, hollow bodies so that it will not interfere with the cable therein, as shown in FIG. 6. For the horizontal structural member 16, however, the cable can pass under the straight pin 26, if desired, so that the tension on the cable will tend to urge the pin 26 upwardly to overcome the weight of the elongate bodies 20 and 22 which tends to deflect the member 16 downwardly.

While the cables 38 and 86 are located within the respective elongate bodies in this instance, they can also be located outside of them. In fact, for the two structural members 16 in FIG. 1, a single cable can be used between them when suitably connected to the two spaced uprights 18. In such an instance, both of the elongate bodies 20 and 22 can be connected directly to the uprights 18 while the cable is placed in tension by a suitable turnbuckle or the like.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. A highway sign structure comprising at least one horizontal structural member and two vertical structural members, said horizontal members comprising two telescoped elongate bodies each of which has a plurality of perforations along opposite sidewalls thereof, a pin extending through two corresponding pairs of holes in said bodies to hold them in fixed relationship with respect to one another, a first end base fastened to an outer end of one of said bodies, a second end base fastened to the outer end of the other of said bodies, a first clamping plate, at least two bolts connecting said first clamping plate with said first end base, said first end base and said first clamping plate being on opposite sides of one of said uprights to hold one end of said elongate bodies in position, an anchor plate located beyond said second end base, a cable extending through said elongate bodies and anchored to said anchored plate and to said first end base, a second clamping plate, bolt means for connecting said second clamping plate and said anchor plate on opposite sides of the other of said uprights to hold the other end of said elongate bodies in position, and additional bolt means associated with said bolt means connecting said second end base and said anchor plate and operable to move said anchor plate and said second end base toward and away from one another.

2. A sign structure according to claim 1 wherein each of said uprights comprises a pair of elongate, telescoping bodies, each of said upright bodies having a plurality of holes distributed longitudinally thereof in opposite sidewalls, a pin extending through two pairs of holes in said upright bodies to hold said uprights at a predetermined length, means for anchoring a cable at the lower end of one of said upright bodies, and means for anchoring the cable at the upper end of the other of said upright bodies and for placing said cable in tension and said upright bodies in compression.

3. A sign structure comprising a horizontal structural member, two uprights, said horizontal structural member comprising two telescoping, elongate bodies, each of which bodies has a plurality of holes on opposite sides thereof distributed longitudinally of said bodies, a pin extending through two pairs of holes in said bodies, a first end base fastened to an end of said bodies, means for clamping said first end base to one of said uprights, a second end base at the other end of said bodies, an anchor plate located beyond said second base, means associated with said second base and said anchor plate for moving said second base and said anchor plate in directions toward and away from one another, a cable extending through said elongate bodies and anchored to said first end base and to said anchor plate, and means for clamping said anchor plate to the other upright.

4. A sign structure comprising a horizontal structural member and two uprights, said structural member comprising two telescoping elongate bodies, a first end base fastened to an end of said bodies, means for clamping said first end base to one of said uprights, a second end base at the other end of said bodies, an anchor plate located beyond said second base, means associated with said second base and said anchor plate for moving said second base and said anchor plate in directions toward and away from one another, a cable extending through said elongate bodies and anchored to said first end base and to said anchor plate, and means for clamping said anchor plate to the other upright.

5. A structure according to claim 4 wherein said anchor plate includes means for releasably anchoring said cable.

References Cited by the Examiner
UNITED STATES PATENTS

| | | | |
|---|---|---|---|
| 511,050 | 12/1893 | Irwin | 16—158 |
| 1,348,145 | 8/1920 | Arden | 189—34 X |
| 2,095,463 | 10/1937 | Wren | 40—125 |
| 2,213,310 | 9/1940 | Gimenez et al. | 189—34 |
| 2,302,233 | 11/1942 | Maddox | 211—177 |
| 2,453,079 | 11/1948 | Rossmann | 189—34 |
| 2,532,893 | 12/1950 | Crotty | 24—134 |
| 2,808,913 | 10/1957 | Frieder | 189—34 |
| 2,865,124 | 12/1958 | Mortellito | 40—125 |
| 2,942,315 | 6/1960 | Johnson | 24—134 |
| 3,119,588 | 1/1964 | Keats | 248—158 |

CLAUDE A. LE ROY, *Primary Examiner.*